E. HANAK.
CABLE GRIPPING MECHANISM FOR OVERHEAD CONVEYER SYSTEMS.
APPLICATION FILED MAY 27, 1918.
1,297,681.
Patented Mar. 18, 1919.
13 SHEETS—SHEET 1.
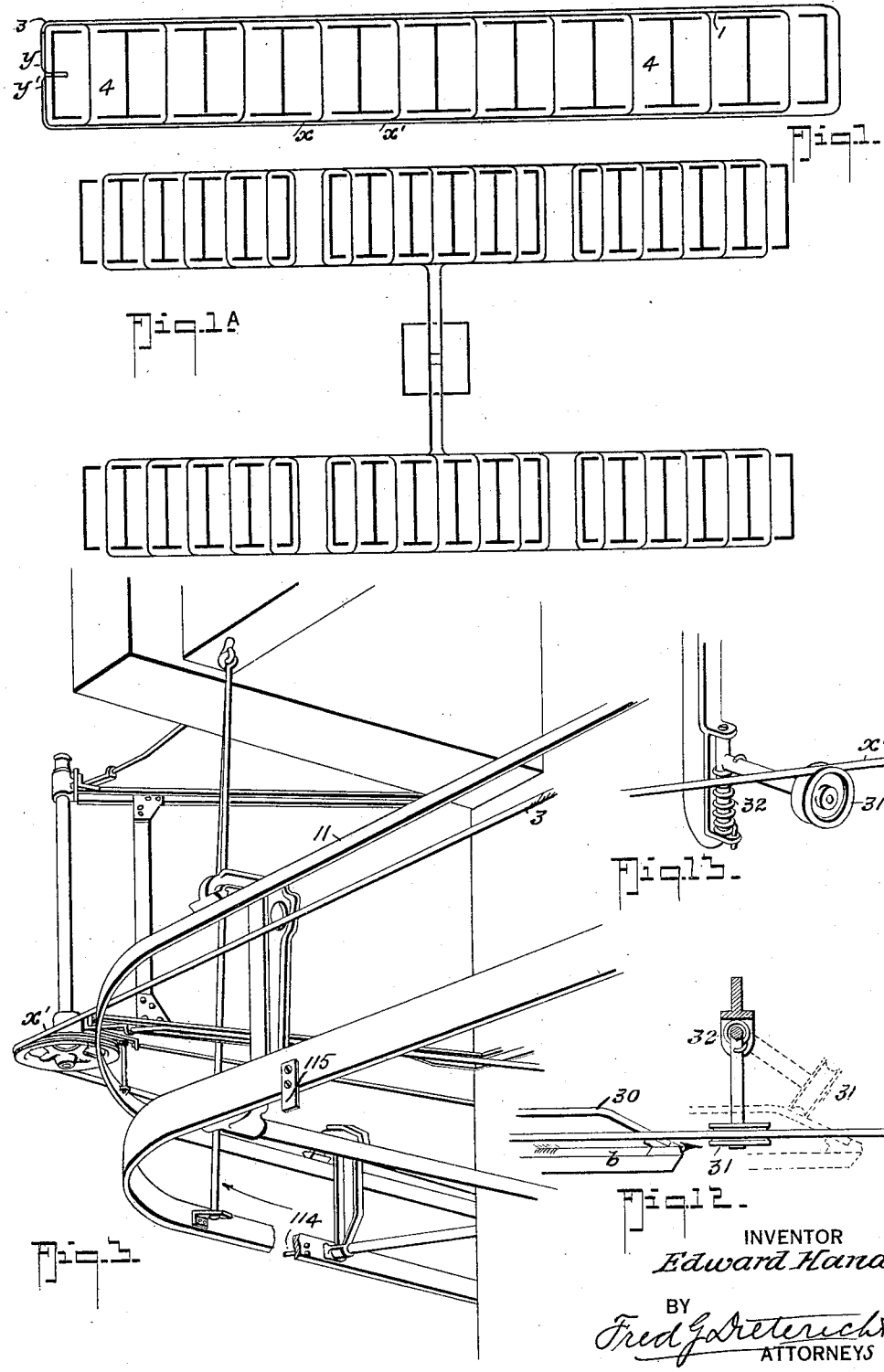
INVENTOR
Edward Hanak
BY
Fred G. Dieterich & Co.
ATTORNEYS

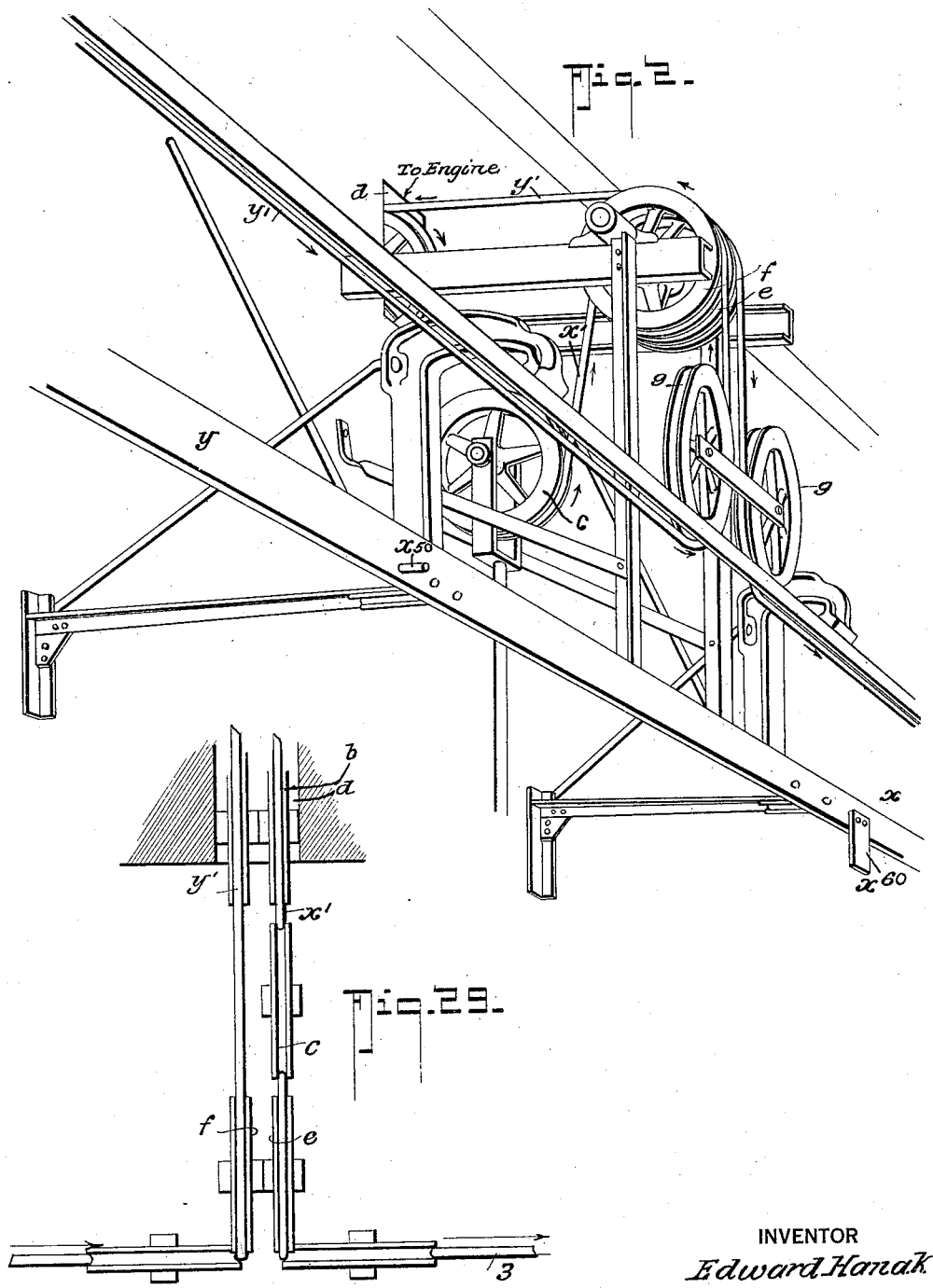

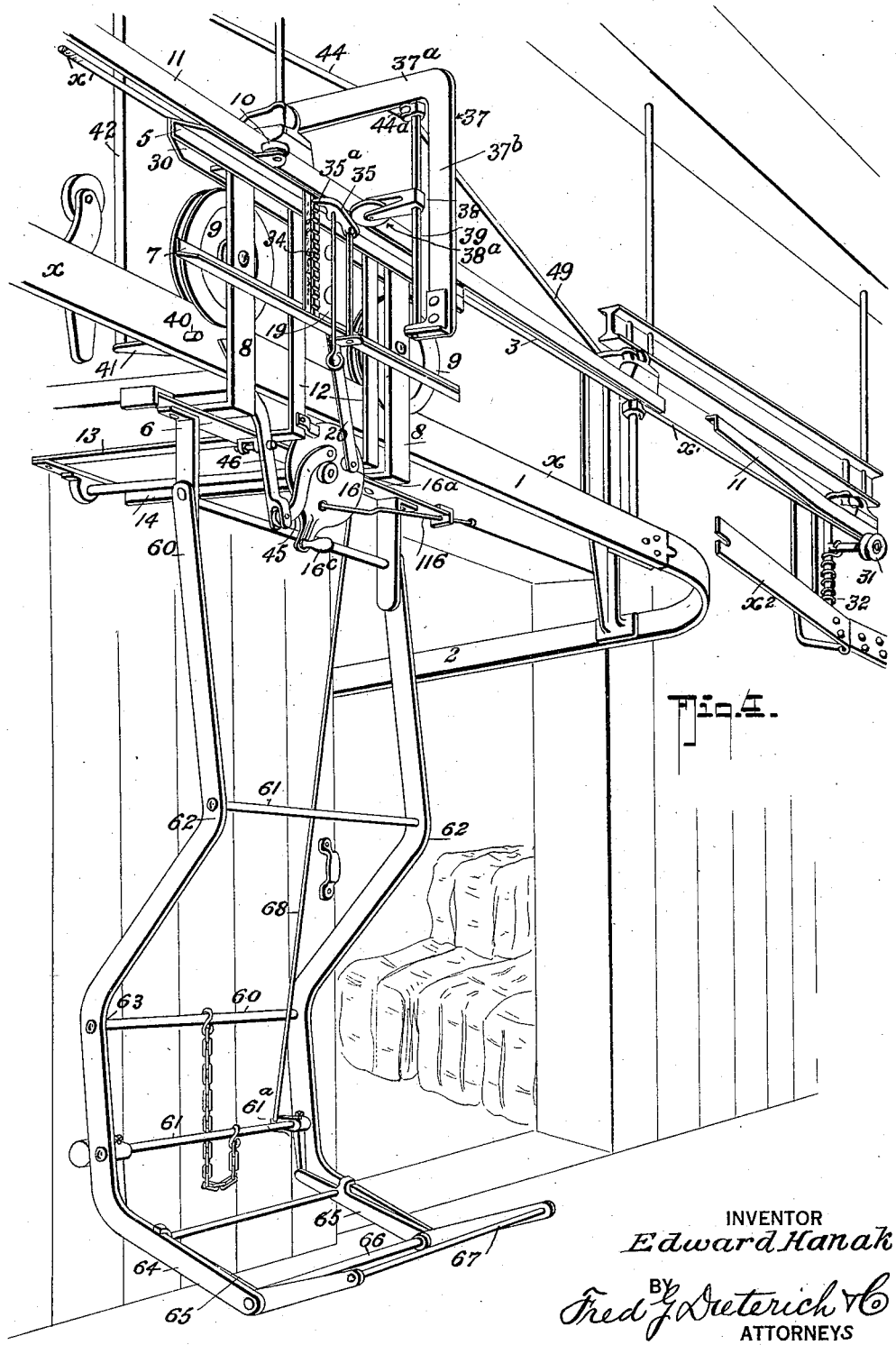

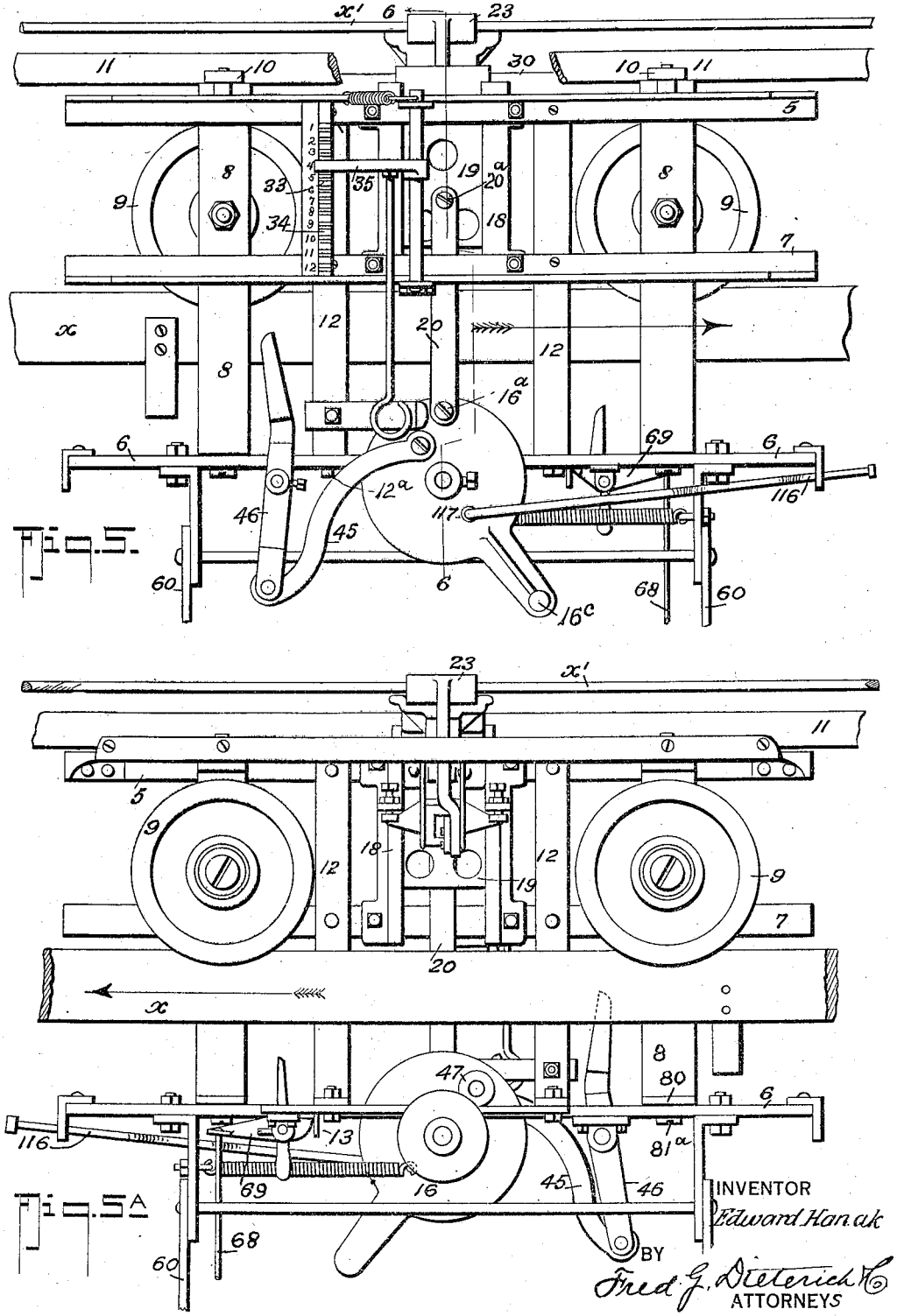

E. HANAK.
CABLE GRIPPING MECHANISM FOR OVERHEAD CONVEYER SYSTEMS.
APPLICATION FILED MAY 27, 1918.
1,297,681.
Patented Mar. 18, 1919.
13 SHEETS—SHEET 5.
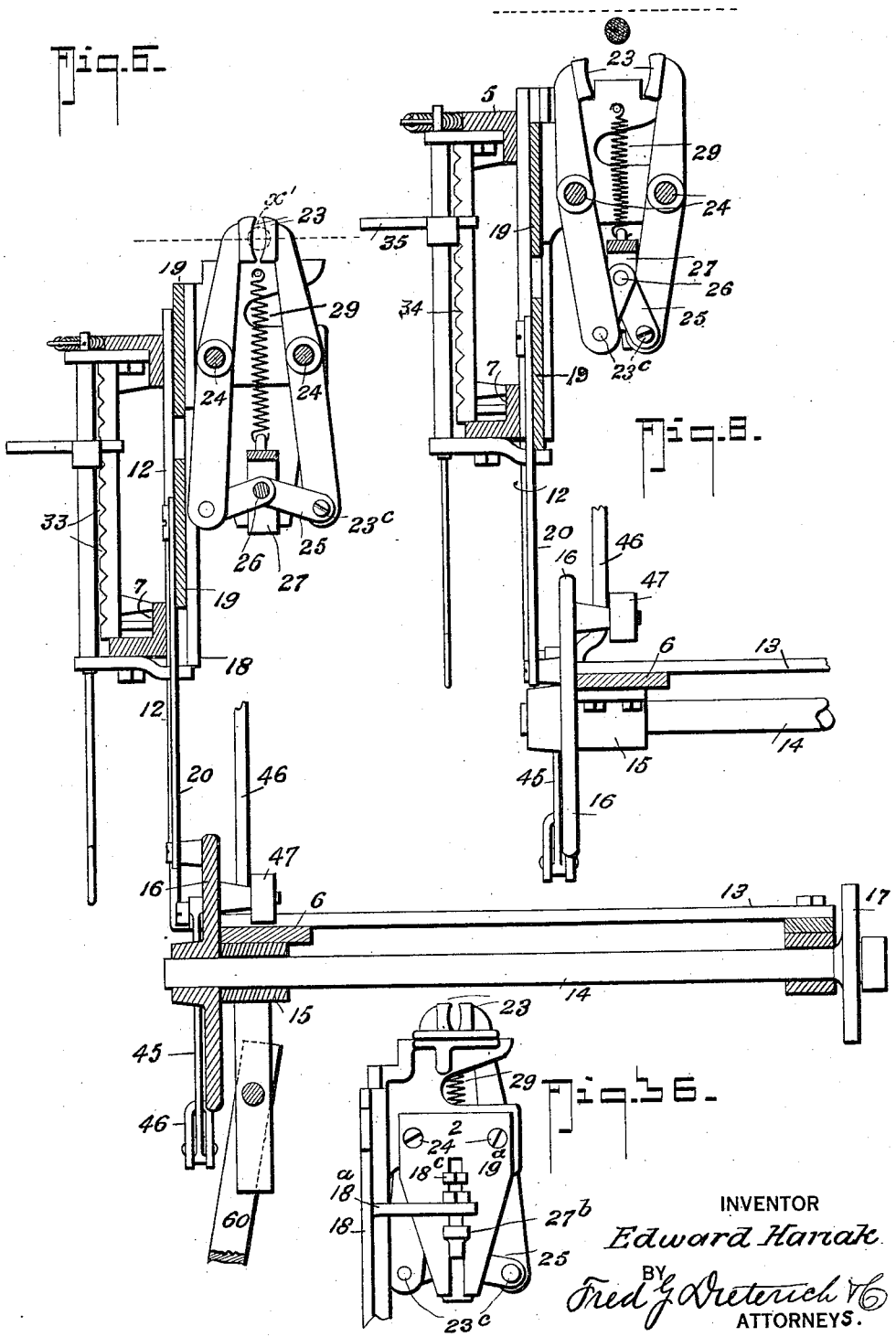
INVENTOR
Edward Hanak
BY
Fred J. Dieterich
ATTORNEYS.

E. HANAK.
CABLE GRIPPING MECHANISM FOR OVERHEAD CONVEYER SYSTEMS.
APPLICATION FILED MAY 27, 1918.
1,297,681.
Patented Mar. 18, 1919.
13 SHEETS—SHEET 6.
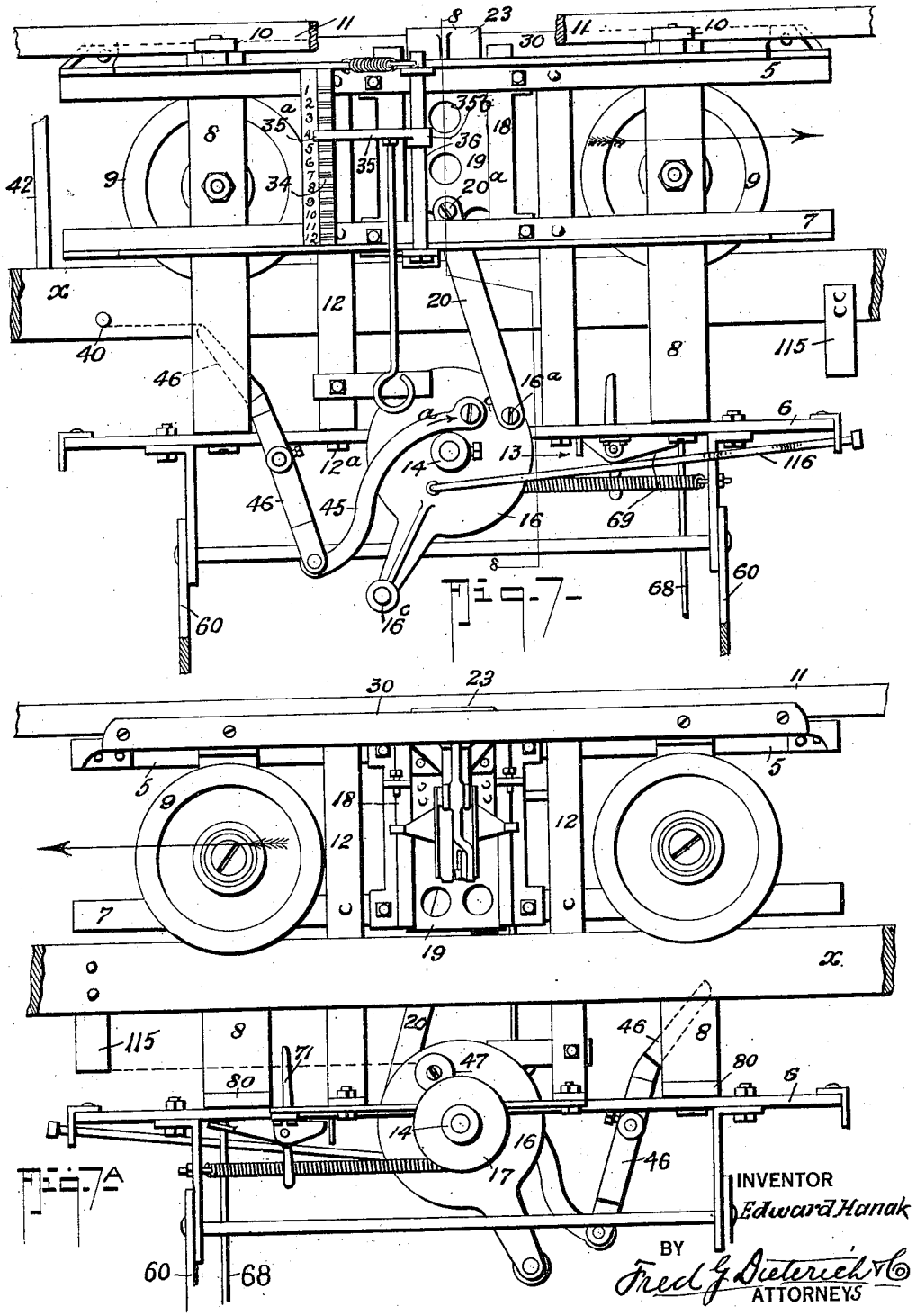
INVENTOR
Edward Hanak
BY
Fred G. Dieterich & Co.
ATTORNEYS

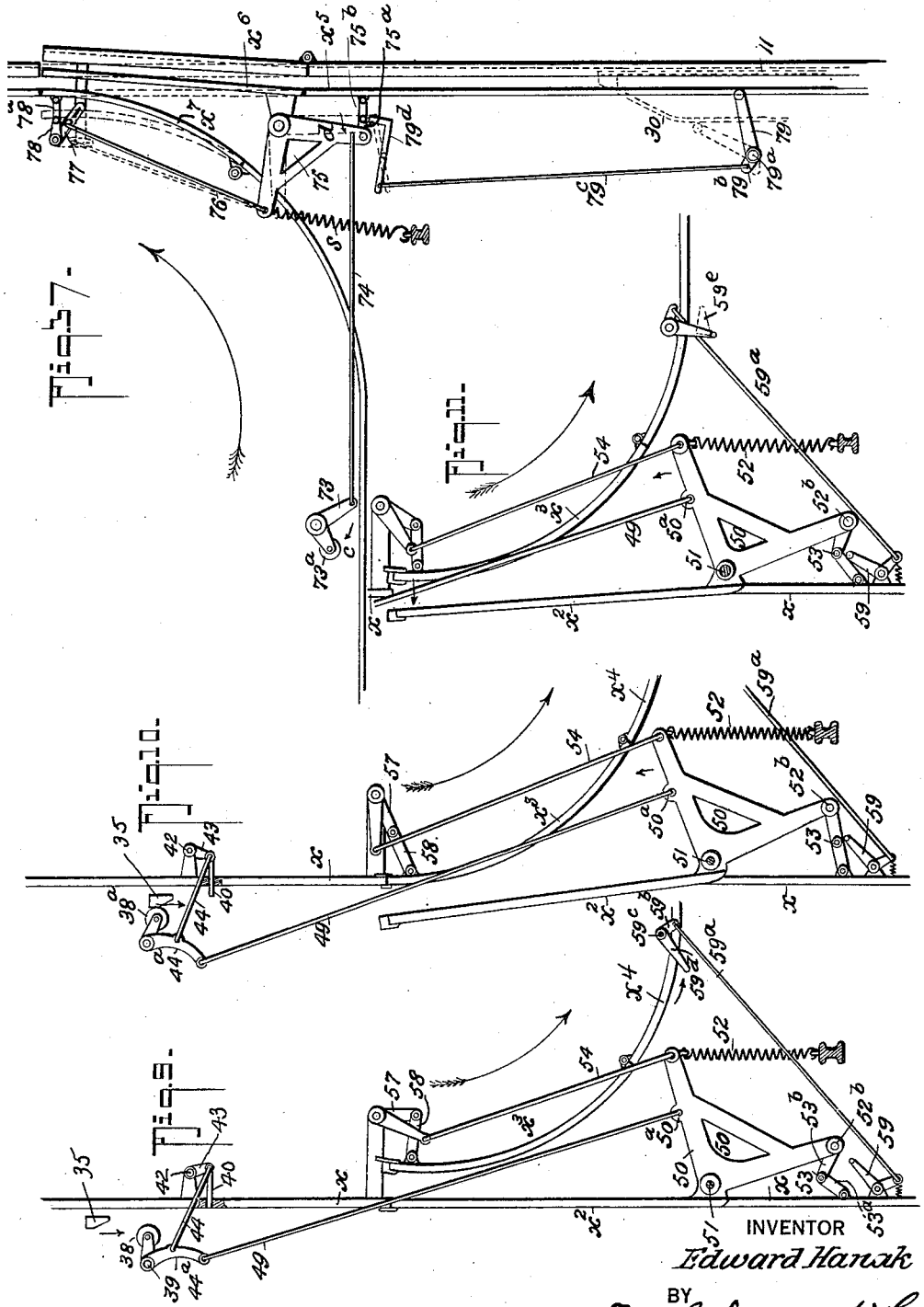

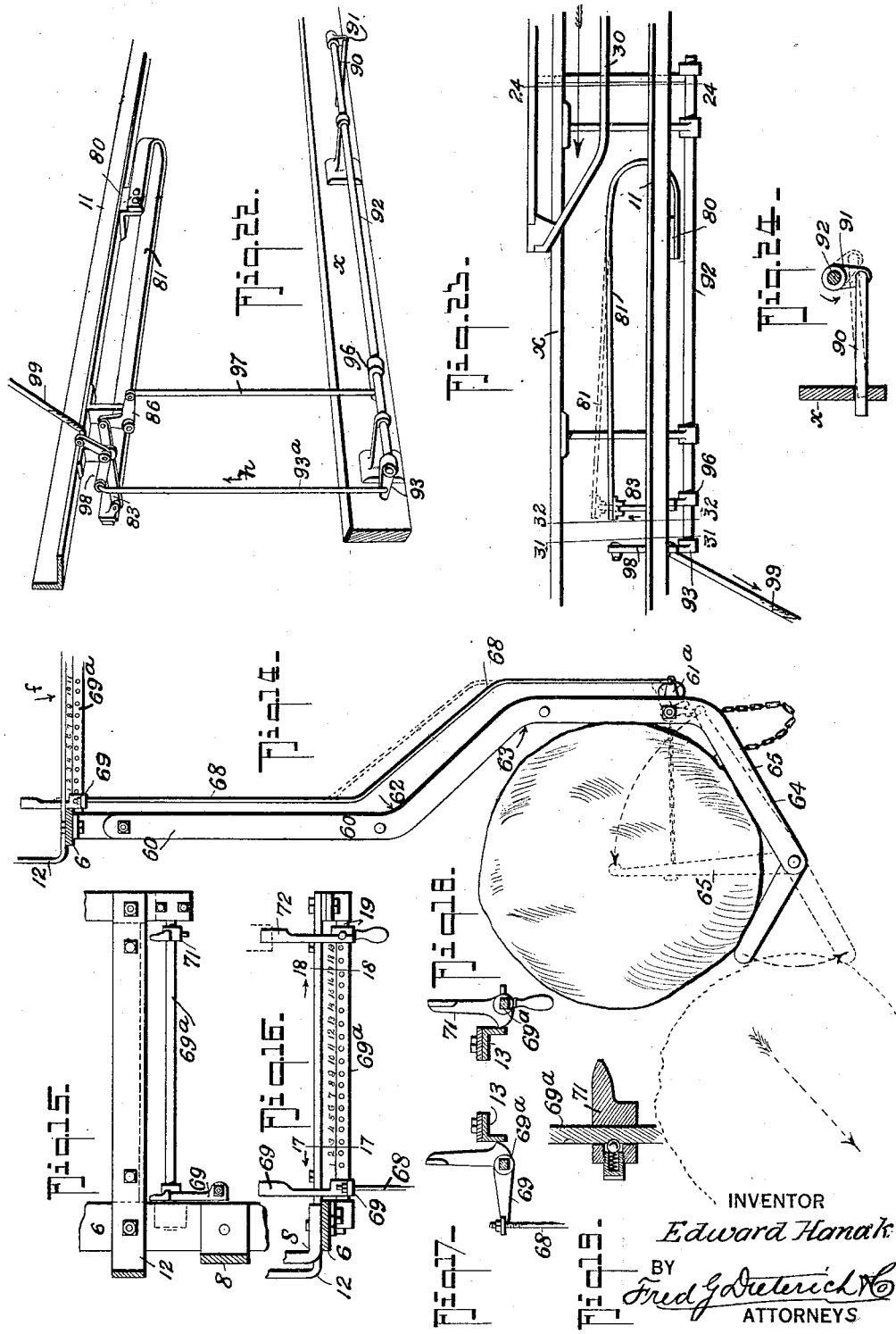

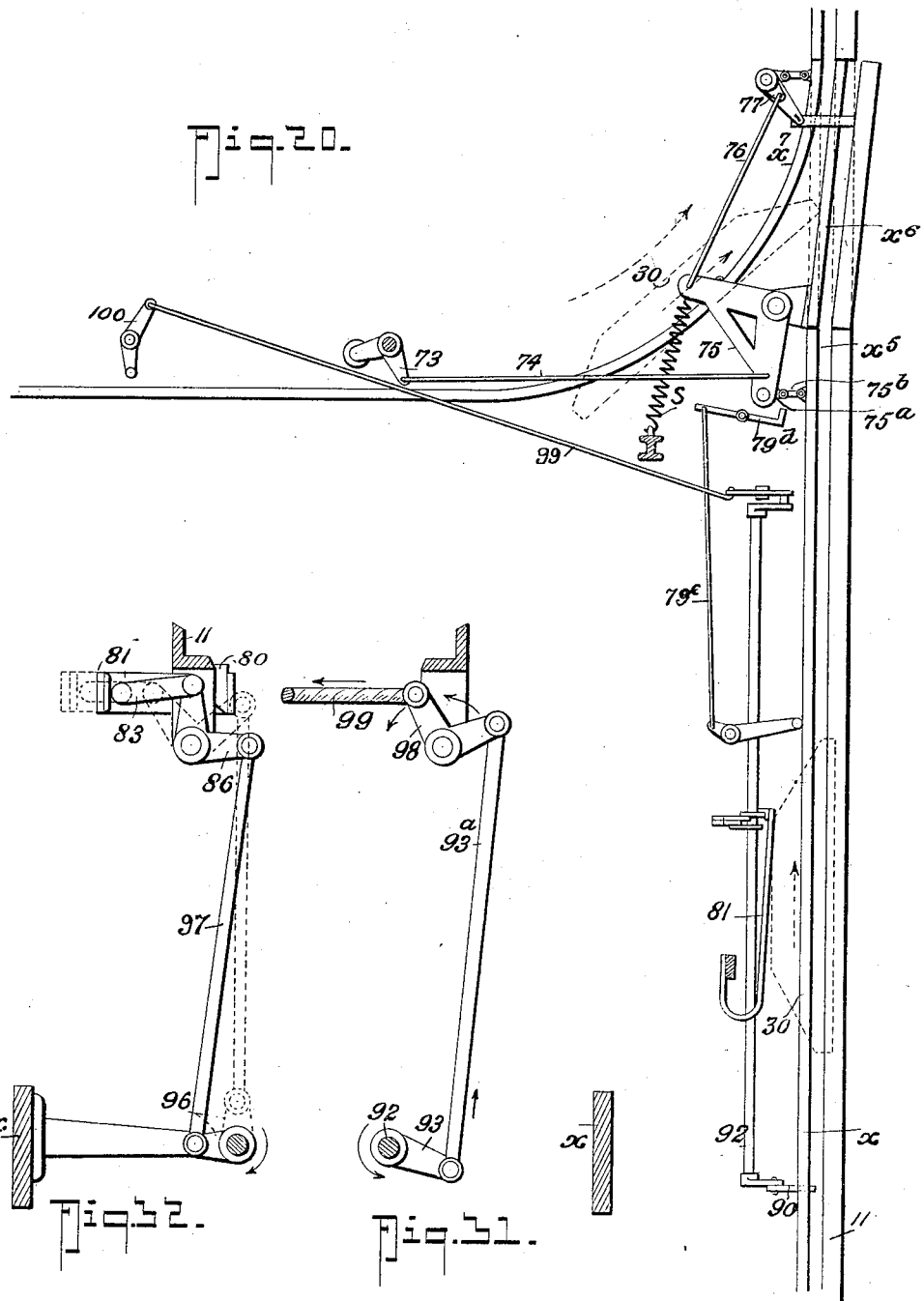

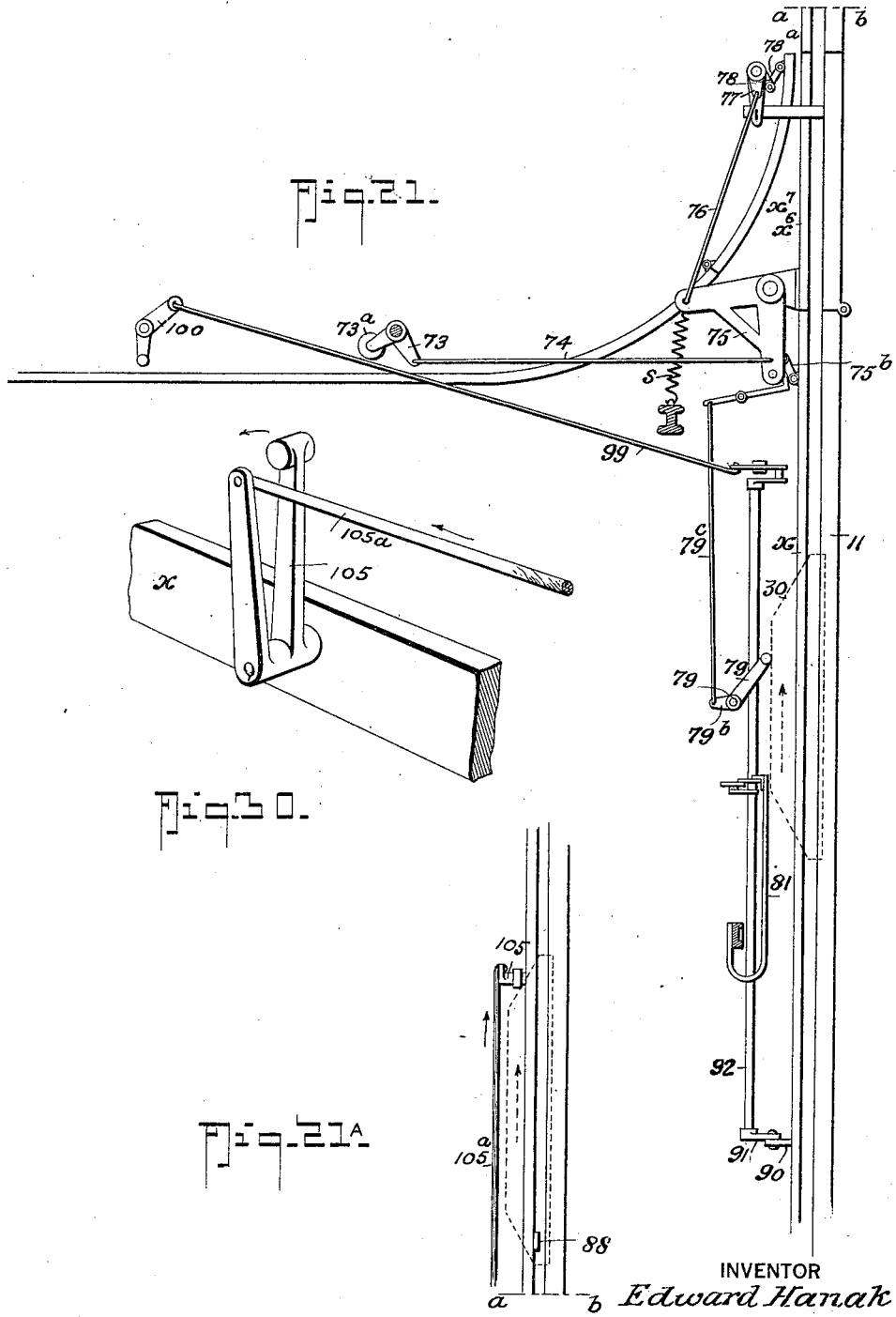

E. HANAK.
CABLE GRIPPING MECHANISM FOR OVERHEAD CONVEYER SYSTEMS.
APPLICATION FILED MAY 27, 1918.
1,297,681.
Patented Mar. 18, 1919.
13 SHEETS—SHEET 11.
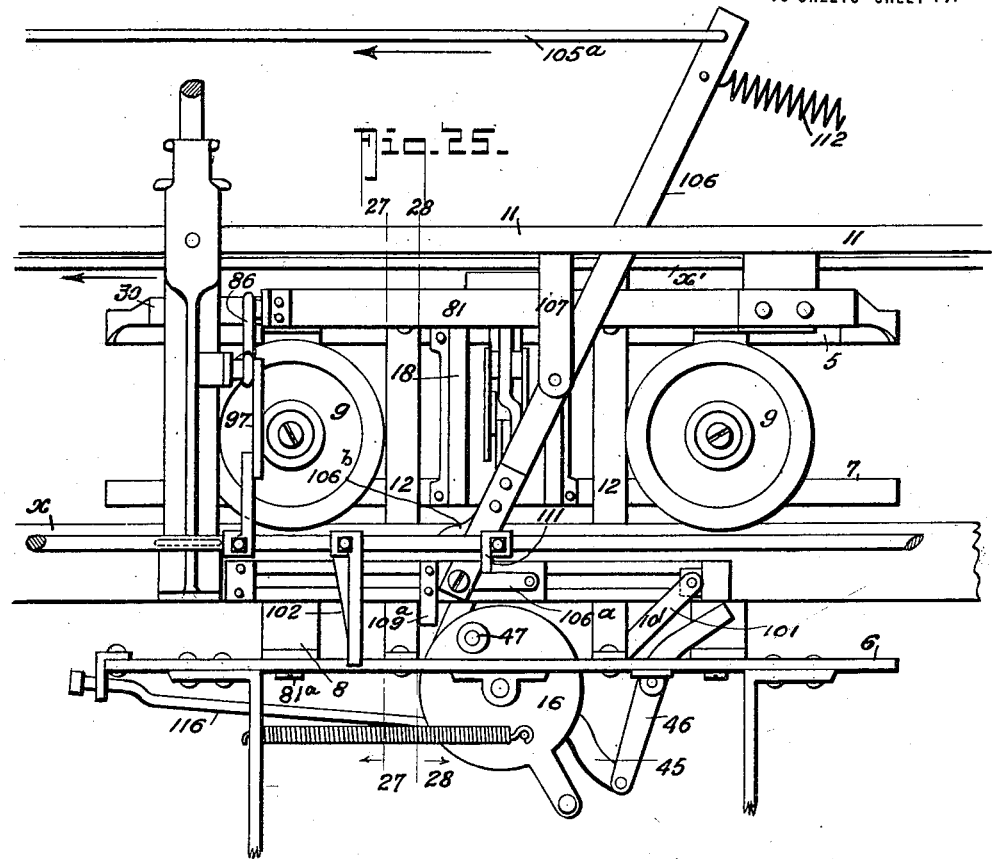
INVENTOR
Edward Hanak
BY
Fred G. Dieterich & Co.
ATTORNEYS

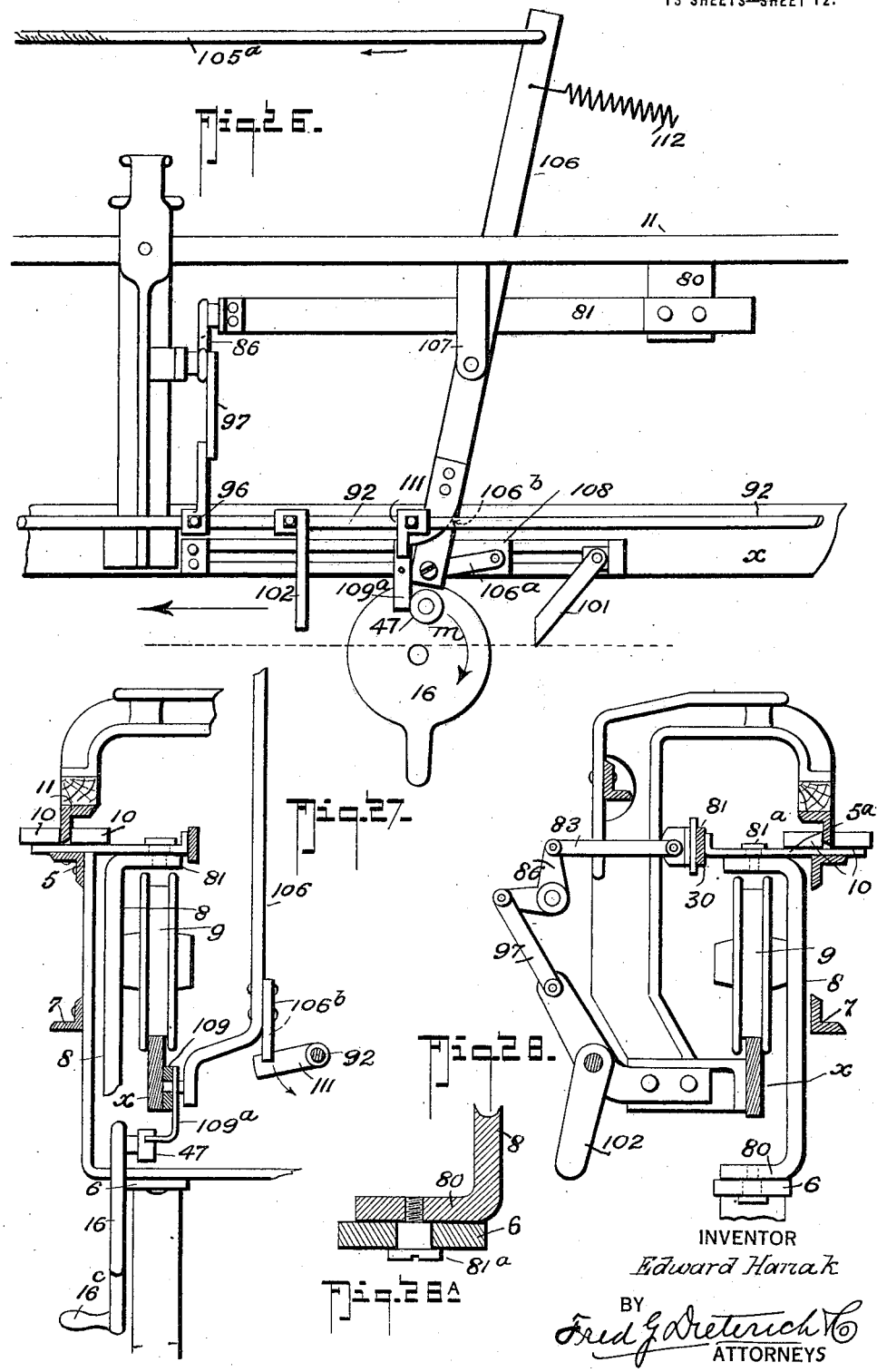

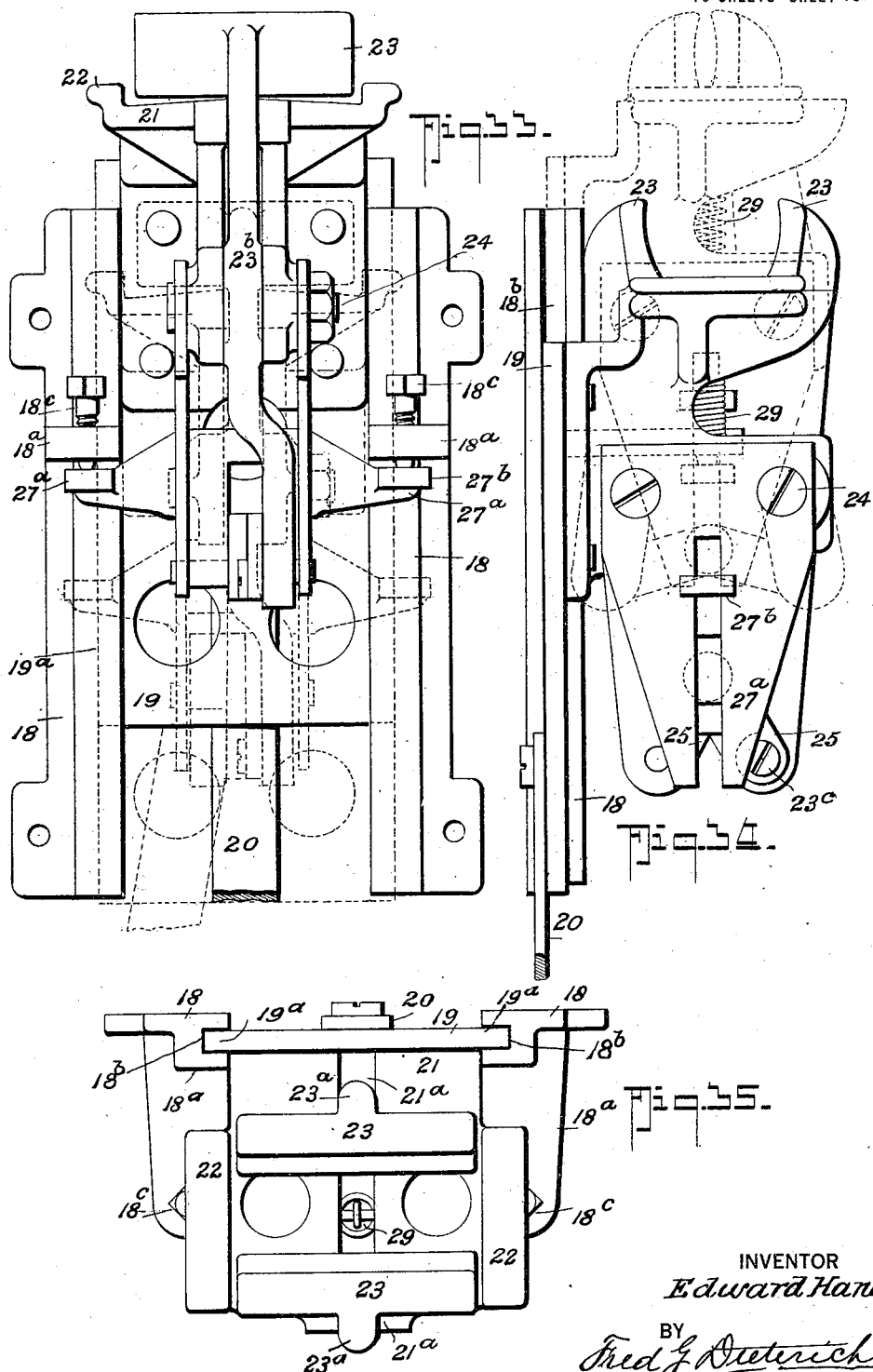

UNITED STATES PATENT OFFICE.

EDWARD HANAK, OF HOUSTON, TEXAS.

CABLE-GRIPPING MECHANISM FOR OVERHEAD CONVEYER SYSTEMS.

1,297,681. Specification of Letters Patent. Patented Mar. 18, 1919.

Original application filed February 25, 1918, Serial No. 219,092. Divided and this application filed May 27, 1918. Serial No. 236,799.

*To all whom it may concern:*

Be it known that I, EDWARD HANAK, a citizen of the United States, residing at Houston, in the county of Harris and State of Texas, have invented a new and Improved Cable-Gripping Mechanism for Overhead Conveyer Systems, of which the following is a specification.

My present invention has reference to an improved cable gripping mechanism that is especially adapted for use in connection with conveyer systems of the overhead type and particularly designed for use in and to form a part of the complete construction of the conveyer system disclosed in my copending application filed February 25, 1918, Serial No. 219,092, and of which this application forms a divisional part.

That the complete construction of and the manner in which it coöperates with the conveyer trolley, as it passes along an endless guide rail, and with the endless conveyer cable, as the conveyer trolley or trolleys travel from a loading point to the delivery point or points and back to the beginning or loading points, I have, in this application, shown and described my improved conveyer system disclosed in my copending application stated, and it should be mentioned that my improved conveyer system is one in which a package or load taken at a loading point, which may be anywhere along the line of the system, is automatically conveyed to any selected point along the system, discharges the load at such point and, after which, the conveyer element or trolley automatically returns to the starting point.

Generically, my invention is in the nature of a mono-rail trolley system in which, after the trolley or goods conveyer is started for conveying the load to a selected place of delivery, the operation of deflecting the trolley or carrier with the load to a place of delivery, discharging the load at some predetermined point at the place of delivery and returning the trolley or carrier to the starting point is automatically effected by the moving trolley, as it proceeds along its course from the starting point back to the place of beginning.

In the present application of my mono-rail trolley conveyer system, I shall illustrate and describe a mechanism entirely mechanical throughout, since in the present showing, I have presented a conveyer system for docks, warehouses and such other places where cotton and other inflammable commodities are handled and where the utilization of electrically controlled mechanisms is prohibited.

Parts for assemblage of all classes of merchandise or manufactured products as well as the raw products for manufacture, are at present carried throughout manufacturing plants by many devices requiring manual attention, such as drayage trucks, hand shoved trolleys and conveyers; and bulk materials of different grades and as many brands are now generally handled by an exhaustless number of mechanical appliances.

Another and important purpose of my complete conveyer system is to provide in a system of the character outlined, a continuously moving trolley cable with which a large number of trolleys may be readily gripped, each of which has a goods holder suspended therefrom, a mono-rail over which the trolleys are conveyed, a plurality of transverse or station rail sections, each combined with an inlet and an outlet switch mechanism, a means on each trolley that operates to first open and then close the inlet switch mechanism and subsequently close and open the outlet switch mechanism of a selected cross over or transverse station rail.

Again, my mono-type rail trolley conveyer system includes a plurality of cross over rails and switch mechanism for the ingoing and outgoing ends of each cross over, an adjustable selective device on the trolley for engaging the switch controlling mechanism which includes means for releasing the trolley cable grip, whereby to free the trolley from the outgoing cable before the said trolley takes the switch at the ingoing end of a selective cross over or station and for moving the trolley grip back to close against the ingoing portion of the moving cable after the trolley takes the closed outgoing switch for the aforesaid cross over.

My complete conveyer system also includes certain simple adjustable selective devices on the trolley for coöperating with a series of relatively fixed selective device trips, each of which designates a predetermined point where the trolleys are to discharge their loads as they cross through or over a selected compartment and adapted for being engaged by the adjustable selective device on the said trolley.

Another and important object in the development of my conveyer mechanism, is the provision of a block system for each cross over or station, also controlled by the moving trolleys, for "blocking" a returning trolley against a possible collision with a trolley that is making a cross over and also the provision of a "safety" stop mechanism which is brought into action under possible contact of one moving trolley with another trolley ahead, whereby the "trailing" trolley is immediately released from grip contact with the conveying table.

With other objects in view and hereinafter fully explained, my present invention is more specifically related to an improved gripping mechanism that forms a part of the complete conveyer system hereinbefore outlined and which constitutes the subject matter of my previously stated copending application and which is especially designed for coöperating with the other elements for effecting the load pick-up, the load discharging, and the shifting operations of the trolley along the main and the cross over track rails and the coacting ingoing and outgoing switch mechanisms.

In the accompanying drawings—

Figures 1 and 1^A are diagrammatic plan views of warehouses, the heavy lines indicating the outer wall and the cross over the partition walls of the building that divide the warehouse into separate compartments, the light lines indicating the main and cross over trolley rails.

Fig. 2 is a perspective view of the cable guide mechanism over which the endless cable passes as it leaves the power mechanism and to which it returns after having completed its circuit.

Fig. 3 is a perspective view that illustrates a corner construction of the trolley trackway, the location of the release and the trip stops for actuating the trolley to release the cable as it approaches the corner and for causing the trolley to again pick up the cable after passing the corner.

Fig. 4 is a perspective view of the trolley, the same being indicated as passing to a selected cross over or compartment, the cable gripping mechanism being shown as released and lowered from the conveyer trolley and in position for passing with the trolley under the conveyer cable as the trolley takes the ingoing switch.

Figs. 5 and 5^A are respectively a front and rear elevation of one of the trolley mechanisms, the grip devices being shown as in the trolley engaging position.

Fig. 6 is a transverse section of the mechanism shown in Fig. 5, taken on the line 6—6 on Fig. 5.

Figs. 7 and 7^A are views similar to Figs. 5 and 5^A, the toggle grip actuating devices being shown as just tripped by a projection on the rail for shifting the parts to the cable released position.

Fig. 8 is a transverse section on the line 8—8 on Fig. 7.

Fig. 9 is a plan view of one of the ingoing switch mechanisms hereinafter specifically referred to, the parts being positioned for holding the main line switch closed.

Fig. 10 is a similar view of the said switch mechanism, the parts being positioned for holding the ingoing or cross over switch closed in with the main line or outgoing trolley rail.

Fig. 11 is a plan view of one of the switch mechanisms and illustrates the "kick back device" hereinafter referred to, and arranged for being actuated by a passing trolley.

Fig. 12 is a diagrammatic plan view that illustrates the manner in which the cam shoe on the passing trolley engages and shifts the cable sheave out of the path of the grip mechanism when released from the cable.

Fig. 13 is a perspective view of a preferred way of mounting the cable sheave.

Fig. 14 is an end elevation of one of the load carriers hereinafter specifically referred to.

Fig. 15 is a detail plan view looking in the direction of the arrow $f$ on Fig. 14.

Fig. 16 is a side elevation of the details shown in Fig. 15.

Figs. 17 and 18 are detail cross sections taken on the lines 17—17 and 18—18 on Fig. 16.

Fig. 19 is a detail horizontal section of the shiftable stop device hereinafter explained, and taken on the line 19—19 on Fig. 16.

Fig. 20 is a diagrammatic plan view that illustrates one trolley as about to pass back onto the main return rail, another or approaching trolley, and the automatically controlled block system for releasing the approaching trolley from the cable for temporarily holding it from movement along the rail.

Figs. 21 and 21^A diagrammatically represent the parts shown in Fig. 20, the approaching trolley being shown as released and as having advanced and operated the "kick back lever devices", the outgoing switch being shown as opened and the main line return switch as closed.

Fig. 22 is a perspective view of one of the "block systems", the parts being shown at the normal position to permit a returning trolley to pass.

Fig. 23 is a diagrammatic plan of the said "block system", the parts being shown in the normal position in full lines and in the trolley cable releasing and car braking position in dotted lines.

Fig. 24 is a detail section that illustrates one of the cable releasing trip stops taken on the line 24—24 on Fig. 23.

Fig. 25 is an elevation of a returning trolley as engaged with a block or brake system, the cable being shown released, the trolley grip resetting and brake releasing lever being shown in this figure.

Fig. 26 is an elevation of the cable grip and the brake releasing lever mechanism and the trolley carriage stops, the grip setting and releasing disk being shown as being rocked to reset the cable grippers, the forward stop being shown as turned up to permit the trolley carriage to pass in the direction of the arrow.

Figs. 27 and 28 are diagrammatic cross sections taken on the lines 27—27 and 28—28 respectively on Fig. 25.

Fig. 28$^A$ is a detail section of parts of the mechanism.

Fig. 29 is a diagrammatic plan view illustrating the manner in which the cable loop passes into the building to the driving power (not shown).

Fig. 30 is a detail perspective view of the crank lever actuated by a returning trolley for shifting the grip resetting lever shown in Figs. 25 and 26.

Fig. 31 is a detail vertical section on the line 31—31 on Fig. 23 that illustrates the bell crank lever devices actuated by a crossing over trolley for rocking the block system operating shaft.

Fig. 32 is a similar section on the line 32—32 on Fig. 23 that illustrates the bell crank devices that connect with and operate the trolley engaging brake.

Fig. 33 is a face view of the cable gripping mechanism, the parts being in position in full lines for gripping the cable and in dotted lines at the cable released position.

Fig. 34 is a side elevation thereof, the parts being shown in full lines in the cable release position and in dotted lines in the cable gripping position, the guide bracket at that side being omitted.

Fig. 35 is a plan view of the parts shown in Fig. 34.

Fig. 36 is a side elevation of the cable gripping device, parts being in position for gripping the cable.

Fig. 37 is a plan view similar to Fig. 11 and shows the manner in which the "kick back devices" for an outgoing switch mechanism are tripped.

In the drawings, I have illustrated a simple arrangement of my improved conveyer system and, in the showing made, I have indicated a single or monotype rail 1 that extends around the warehouse, it being supported on suitable brackets projected from the warehouse wall and spaced a suitable distance from the outside of the wall, as shown.

Coöperative with the main rail 1 is a number of cross over rails 2, one for each separate bay or room in the warehouse onto which the trolleys pass from the outgoing rail portion $x$ to the return or incoming rail portion $y$, it being understood that in the practical arrangement of the mono-rail, the incoming portion may be at a slightly lower plane than the outgoing rail at the other side, whereby the cross over rails have a sufficient incline that the trolleys, as they leave the main track section to ride upon the cross over rails, pass by gravity from the outgoing rail portion $x$ to the incoming rail portion $y$.

At this point, it should be stated, the first or forward end room 4 of the warehouse may be considered the power or plant compartment, since here is where the endless cable engages with power and transmission mechanism.

Any suitable means may be provided for imparting continuous motion to the endless conveyer cable 3 and for guiding the outgoing and incoming cable sections $x^1$ and $y^1$ from and to the power mechanism. I prefer to use the cable guiding means best shown in Fig. 2, which shows a cable passage $d$ in the front wall of the power compartment from which the outgoing cable section $x^1$ passes onto a pulley $b$, down and under a tightener pulley $c$, then up and over one, $e$, of a pair of guide pulleys $e$ and $f$, the said outgoing section $x^1$ passing along to the loading side of the building while the incoming cable section $y^1$ passes under a pulley $g$, from thence over the overhead pulley $f$ adjacent the pulley $e$ from which it passes through the opening $d$ in the warehouse wall and to the driving mechanism, not shown.

At the approach side of the cable guiding mechanism shown in Fig. 2, the return trolley rail $y$ has a cable release stop $x^{50}$ and, at the outgoing side, the rail $x$ has a cable pick-up stop $x^{60}$, as shown, it being understood that the trolley passes over the gap between the cable portions $x^1$ and $y^1$ by its momentum and is freed from the cable.

That the operation of my improved conveyer system may be more readily understood, it should be mentioned, after placing a load (a round bale for example) on the hanger suspended from and which travels with a trolley or traveling carrier, an operator, by hand operation, sets the cable grip mechanism and thereby starts the trolley along an overhead rail on which the trolley advances and in its travel delivers the load at a predetermined or selected place and, after delivering the said load, continues in its travel and returns to the place from which it started, for reloading.

Referring more particularly to Fig. 4, which illustrates the position of a trolley in the act of conveying a load along the rail section $x$ and as approaching the doorway of the compartment into which the trolley is to pass to deliver the load, and the trolley as about to engage with mechanism that simultaneously effects the release of the grip mechanism from the cable, and lowering the said grip mechanism in a plane below the traveling cable to provide for passing the trolley crosswise under the cable, the said trolley mechanism being also positioned for effecting the setting of the switch mechanism on the incoming side of the compartment across which the trolley is to travel and in which the load is to be delivered at a predetermined place therein, as will hereinafter be more fully explained.

*The trolley mechanism.*—The trolley mechanism, clearly illustrated in Figs. 5, 5$^A$, 7, 7$^A$ and 8, includes an upper, a lower and an intermediate horizontal bar or beam, designated 5, 6 and 7 respectively and the said bars are braced by uprights 12—12 riveted at their upper ends to the outside of the uppermost horizontal member 5.

The lower ends of the uprights 12 are bent horizontally inward and form a part of a horizontal yoke frame 13. Near the outer or front ends, the members 12—12 are bolted, as at 12$^a$—12$^a$, to the lower horizontal frame bar 6, as is best shown in Figs. 5$^A$ and 7$^A$, by reference to which and to Fig. 6, is will also be seen the inner end of the said yoke frame 13 forms a bearing for the inner end of a shaft 14 that journals in a bearing bracket 15 on the under face of the bar 6.

8—8 designate a pair of standards that include horizontal foot portions 80—80 rockably secured on the trolley frame bar 6. The upper ends of the standards 8—8 also terminate in horizontal members 81 rockably secured by a stud bolts 81$^a$ to an inwardly projected cross bracket 5$^a$ that forms a part of the frame, see Fig. 28.

Each standard 8 supports a vertically disposed grooved trolley wheel 9 and the said wheels engage the trolley rail sections $x$—$y$ and the switch rails in their travel from the starting point back to the place of beginning and to facilitate the travel of the said wheels 9 on the curves, the standards 8—8 are rockably mounted, as before stated, and further for properly holding the trolley in operative position, horizontal guide rollers 10—10 are mounted on the outer end of cross members 5$^a$ that engage an upper guide rail 11 which extends around the warehouse in parallelism with the trolley rails $x$—$y$, as shown.

16 designates what I hereinafter term the cable grip adjusting and locking disk, since the main function of the said disk is to elevate the grip mechanism, presently described in detail, for being clutched with the cable and for releasing the said mechanism from the cable and lowering it in a plane below the said cable.

Disk 16 has a radially extended handle 16$^c$ at the lower edge for setting the gripper jaws into engagement with the cable by hand.

The rear end of the shaft 14, that carries the disk 16 has a guide pulley 17 hereinafter again referred to.

At this point, it should be mentioned that rotary movement of the disk in one direction effects the application of the grip mechanism and the conveying cable and locks such mechanism to its cable grip position and a rotary movement of the said disk in the other direction, effects the release of and the lowering of the said grip mechanism, the said special construction of which I shall now proceed to describe in detail.

*The grip mechanism.*—The grip mechanism, best illustrated in Figs. 6, 8, 33 and 34, includes a frame that consists of a pair of vertically slotted side guides 18—18 bolted at their upper and lower ends to the upper and intermediate horizontal trolley frame members 5 and 7, as is best shown in Figs. 5, 5$^A$ and 36, from which it will be also seen that each of the guides 18—18 includes a rearwardly extended horizontal bracket 18$^a$ and each of the said brackets carry an adjustable stop screw 18$^c$, the purpose of which will presently appear.

The cable grip jaws in the construction shown, are mounted on a carriage that reciprocably engages the stationary frame and includes a body portion 19, the opposite side edges 19$^a$—19$^a$ of which slidably engage the grooves 18$^b$—18$^b$ in the side guides 18—18 and the said carriage is intermittently reciprocated, through the movement of the reversibly rotated disk 16 hereinbefore referred to, by a link member 20, one end of which has a wrist or crank pin connection with the disk 16, as at 16$^a$, and the other end thereof connects with a stud 20$^a$ on the front face of the said carriage 19, as shown.

The carriage 19 also includes a top plate 21 that is formed with a transverse slot 21$^a$ and opposite side guides 22, between which the upper or neck ends 23$^a$—23$^a$ of the opposing cable grip jaws 23—23 are oscillatably mounted.

The cable jaws 23—23 include long shanks each of which is formed with a transverse hub 23$^b$ through which pass pivot bolts 24—24, each of which has its end journaled in bearings formed in the opposite side members 19$^a$—19$^a$ of the carriage 19.

The lower ends of the jaw shanks are pivotally connected as at 23ᶜ—23ᶜ, to toggle members 25—25 pivotally joined by a cross bolt 26 with a follower or cross head 27, the opposite ends of which terminate in guide flanges 27ᵃ—27ᵃ that ride in guide slots 28—28 formed in the side brackets or members 19ᵃ—19ᵃ of the carriage 19 and which is normally pulled to its uppermost position, to actuate the toggles for holding the cable gripping jaws to their open or cable released position, by a strong coiled spring 29 that joins with the cross head and the top plate of the carriage, as is best shown in Figs. 6 and 8 of the drawings.

Each guide flange of the follower or cross head 27 has a lateral member 27ᵇ—27ᵇ for coöperating with the adjustable screw stops 18ᶜ—18ᶜ on the vertical side members of the stationary frame, as will presently more fully appear.

By referring particularly to Figs. 5 and 5ᴬ, in which the cable grip is shown as clamping the conveyer cable $x^1$, it will be noticed that the cable is shown as lifted above the normal or cable sheaves engaging position (see broken line) and, at this point, it should be mentioned that the said cable sheaves, as the trolleys pass along the trolley rail, are automatically shifted and held out of the path of the passing cable grip mechanism, and this feature of my invention is illustrated in detail in Figs. 12 and 13, by reference to which it will be seen that the trolley is provided with a cam shoe 30 tapered at both ends, which, as the trolley moves in the direction indicated by the arrow $b$ engages the nearest cable sheave 31, pushes it and swings it back out of the path of the grip devices until the said devices of the grip devices until the said devices pass and until the rear tapered end of the cam shoe 30 passes the said sheave 31, which latter is then restored to its normal or cable guiding position by a coil spring connection 32.

As before stated, when starting a trolley on its load conveying and delivering journey, it is set or adjusted for selecting the particular cross over compartment of the warehouse or other place of delivery for controlling the ingoing and outgoing switch mechanism as it passes onto and from the said selected cross over and for selecting, while in transit, the place on the cross over where the load is to be dropped.

For selecting the ingoing switch mechanism, each trolley has a vertical indicator bar 33 on its front face provided with a vertical series of horizontal cross notches or ratchets 34, twelve of such notches being shown for indicating that the system is arranged for working twelve separate compartments or cross overs.

Coöperative with the indicator member 33 is an adjustable cam dog 35 provided with a nose 35ᵃ for interlocking with any selected one of the notches 34 and with an apertured heel 35ᵇ that slidably engages a vertical tumbler rod or shaft 36 mounted upon the front of the trolley, as shown.

*Switch mechanism.*—At a suitable distance in advance of each transverse compartment or cross over of the warehouse, is mounted an overhanging bracket 37 that includes a horizontal arm 37ᵃ secured to the upper or guide rail 11, and a vertical member 37ᵇ pendent from the arm 37ᵃ, back of which the trolley passes. Each bracket 37 carries a tumbler shaft 39 and each of the shafts 39 has a crank arm 38 that carries a roller bearing 38ᵃ for being engaged by the cam dog 35 on the passing trolley, when the said dog is set for selecting the said mentioned roller bearings 38ᵃ, it being understood the bearings 38ᵃ for the different cross over points are set in different horizontal planes to register with the different set of cam dogs 35 mounted on the different passing trolleys.

40 is a shiftable stop, one of which is located at a suitable distance ahead of each cross over or ingoing switch mechanism and each of the said stops is normally held to its drawn back or inoperative position. The stop 40 connects with a crank 41, see Fig. 4, on the lower end of a rock shaft 42 mounted on the trolley frame and which has a crank 43 at the upper end (see Figs. 9 and 10) which, through a link connection 44 joins with the crank arm 44ᵃ on the upper end of the tumbler shaft 39, the several parts mentioned being so arranged that as the roller bearing 38ᵃ is engaged by the cam dog 35, as stated, the stop member 40 is projected through the trolley rail in the path of the moving trolley for releasing the cable grip mechanism, which operation is explained as follows:

By referring to Figs. 5, 5ᴬ, 7 and 7ᴬ which show the trolley mechanism in front and rear elevation, it will be observed the trolley disk 16, the adjustments of which, in the manner to be stated, applies and releases the grip mechanism, is positioned for holding the gripper jaws elevated and as gripping the cable, and, when thus positioned, the link 20 is vertically extended and tends to hold the grip devices locked at their uppermost or cable gripping position.

A link member 45 pivotally joins, at one end, with the front face of the disk 16, its other end being pivotally connected with the lower end of a rock lever 46, the upper end of which travels over the outer face of the trolley rail $x$ for engaging with the projected stop 40, it being apparent from Fig. 7 that as the trolley advances in the direction of the arrow, when the lever 46 has engaged the stop 40, it has pushed the link 45 in the direction of the arrow $a$, turns the said disk 16, as indicated, and thereby brings the several parts to the position shown in said Fig. 7, which illustrates the trolley as released from the cable and the cable jaws in a plane below the normal cable line, it being understood that since the entire gripping mechanism is thus lowered to a plane below the conveyer cable, the said trolley mechanism may freely pass under the cable as it takes the ingoing switch to the selected cross over or compartment into which it is to pass, and the said parts remain in the said last mentioned position until the disk 16 is again turned in a reverse direction by reason of a stop roller 47 on the back of the disk coming into contact with a suitably located stop 115 in the path of the moving trolley, as will be hereinafter more fully explained.

*Ingoing switch mechanism.*—A rod 49 at one end connects with the crank $44^a$ on the tumbler shaft 39, and extends forwardly and joins with one end $50^a$ of a bell crank lever 50 fixedly mounted on a vertical rock shaft 51 to which the main line switch rail section $x^2$ is attached so that, as the shaft 51 is rocked in one direction, the switch rail $x^2$ opens, and, when turned in the other direction, under the tension of a spring 52, it brings the switch rail $x^2$ back to the main line closing position.

Connected with that end of the bell crank opposite the end $50^a$ is a toggle device 53 that consists of two links $53^a$—$53^b$ pivotally connected with each other, one member $53^a$ being pivotally connected with the rail $x$ and the other $53^b$ pivotally connected with the bell crank lever end $52^b$, as is best shown in Fig. 10 which shows the main switch section $x^2$ as moved out to the open position and the hinged curved switch member $x^3$ as in the closed position for transferring the trolley from the main line $x$ onto the cross over rail $x^4$ in the selected compartment.

The manner in which the curved or ingoing switch $x^3$ is shifted to the closed and open position is best explained as follows, reference being especially directed to Figs. 9 and 10 of the drawings in which 54 designates a link rod that joins at one end with the end $52^a$ of the bell crank lever 50 and, at the other end with a crank 55 on the lower end of a rock shaft 56 that carries a toggle link 57 that pivotally joins with another toggle link 58 hinged on the cross over rail $x^4$, as shown.

By reason of the peculiar arrangement of the parts that constitute the ingoing switch mechanism, as shown and described, as the trolley passes along in the direction indicated and, as the tumbler shaft 39 is rocked in the direction indicated and while actuating the cable grip devices to release and lower the trolley from the cable, the bell crank 50, at the ingoing side, is rocked against the tension of its spring 52 in the direction indicated on Fig. 10 and in thus moving the said bell crank 50, the latter, through the link rod 54 adjusts the toggle link members 57 and 58 to form, as it were, a rigid connection between the rock shaft 70 and the outer end of the switch section $x^3$ thereby bringing the said end of the switch $x^3$ in proper alinement with the main line $x$, and it should be stated that the parts are held locked to their adjusted position, by the toggle link connections 58—57 and $53^a$—$53^b$ until the connection $53^a$ and $53^b$ is broken to thereby allow the bell crank lever 50 to be swung back to its other position under the tension of its spring and simultaneously shift the ingoing or curved switch section $x^3$ to the open position and the main line switch section $x^2$ to the closed position with the main rail $x$.

59 designates a "kicker lever" pivotally mounted adjacent the toggle members $53^a$—$53^b$ and normally held out of engagement with the said members $53^a$—$53^b$ when they are lengthened to the bell crank lever locking position, as indicated in Fig. 10.

$59^a$ designates a rod that joins with the kicker 59 and extends across the compartment through which the trolley is to pass and connects with a crank $59^b$ on the rock lever $59^c$ provided with a member $59^d$ that is engaged by a lug $59^e$ on the trolley as it passes over to the outgoing switch mechanism and, by reason thereof, rocks the aforesaid lever $59^c$, pulls the rod $59^a$ in the direction indicated and swings the "kicker" 59 into engagement with the toggle $53^a$—$53^b$, breaks the joint and thereby allows the spring 52 to pull the bell crank 50 back to the position shown in Fig. 9 and closes the main line switch member $x^2$ with the main line $x$ and opens the ingoing or curved switch member $x^3$ from the said main line.

As hereinbefore stated, each trolley includes a load carrier upon which the load, a round bale for example, is placed before starting the trolley on its way and which, in passing through the selected compartment, as the trolley crosses over from the outgoing to the ingoing cable portion, is automatically delivered at any of a selected one of bins or sub-compartments in the main compartment through which the trolley passes.

The load carrier, which is best shown in Figs. 4 and 14 consists of a pair of hanger bars 60—60, the upper ends of which are bolted to the lower bar 6 of the trolley frame and the said hanger bars 60 are braced by cross rods 61 and have their lower ends bent inwardly as at 62, then downwardly as at 63, and then outwardly to form substantially horizontally projected sides or carrier arms 64—64.

65—65 denote rocking lever arms pivotally mounted on a cross bar 66 secured to the side arms 64—64, and the front ends of the said lever arms are bent up at an obtuse angle to the side arms 64 and are braced by a cross rod 67, as shown.

On one of the cross rods 61 of the hanger frame is pivotally mounted a bell crank dog or lever 61$^a$ which engages and holds the rocking lever arms 65—65 from tilting on their fulcrum, while conveying the load, as indicated in Fig. 4.

68 denotes a trip rod that connects with the crank lever 61$^a$ and with a crank member 69 on a bar or arm 69$^a$ which constitutes a part of the trolley mechanism.

Bar 69$^a$ is rockably mounted on the trolley frame and it carries an adjustable stop or trip member 71, which, before starting the trolley on its travel to the selected compartment, is set for engaging a fixed stop or abutment 72, one for each bin or sub-space in the said compartment, with which the said member 71 engages as the trolley passes from the incoming to the outgoing side, it being understood that as the stop 71 engages the predetermined member 72, the bar 69$^a$ rocks and through the trip rod 68, lifts the crank lever 61$^a$ and thereby releases the load holding arm 65—65, see Fig. 14, for dropping the load at the selected place.

*Outgoing switch mechanism.*—In Figs. 20, 21 and 37, which illustrates an outgoing switch mechanism in detail, $x$ indicates the trolley rail, $x^6$ the switch section thereof and $x^7$ the curved switch rail that is hinged to the cross over rail and which, at times, is swung out to a line with the main line $x$ when the switch section $x^6$ is moved to the open position.

A bell crank lever 73 is suitably mounted along the cross over rail and is provided with a roller 73$^a$, which, when the main line switch $x^6$ is closed and the curved or outgoing switch $x^7$ is open, as shown in dotted lines Fig. 37, is engaged by a suitable projection on the passing trolley and is thereby swung in the direction indicated by the arrow $c$. As the bell crank 73 is swung in the direction indicated through a connecting rod 74, it swings a bell crank lever 75—that connects with the main switch rail $x^6$—in the direction of the arrow $d$ and through a link 76 it rocks a crank shaft 77 which by link members 78 and 78$^a$ joins the shaft 77 with the curved switch $x^7$, the connection being such that the main line and the curved or outgoing switch members operate in harmony; as one opens, the other closes and vice versa.

After the trolley passes from the cross over onto the return portion of the main track, an incoming trolley that follows along the said return trolley section, trips the aforesaid outgoing switch mechanism.

The manner of tripping said outgoing switch mechanism is clearly indicated by Figs. 21 and 37, by reference to which it will be seen a crank arm 79, mounted on a rock shaft 79$^a$ located, at a suitable point in advance of the switch mechanism to be tripped, projects into the path of the trolley cam shoe 30, see dotted lines Figs. 21 and 37, which rocks the shaft 79 and through a crank 79$^b$ on the shaft and a link connection 79$^c$, it actuates a kicker lever 79$^d$ which breaks a toggle connection 75$^a$ and 75$^b$ and coöperative with the bell crank 75 thereby allows the spring $s$ to pull the bell crank 75 back to swing the curved switch rail $x^7$ out of register with the main line and the main line switch $x^6$ into register with the said main line.

*The block system.*—A block system is provided for each transverse compartment or cross over. In Figs. 20 to 24 inclusive is shown one of the block systems in connection with so much of a cross over rail, an outgoing switch mechanism, next, but in advance of the block system, and a trolley traveling on the cross over, as is necessary to illustrate the operation of the said system.

80 designates a bracket that is secured to the overhead guide rail 11 with which connects one end 81$^a$ of a flat spring band brake 81, the free end of which, through a link member 83, joins with one arm 85 of a bell crank lever 86.

Normally the free end of the brake band 81 is pulled back to the position shown in full lines in Fig. 23 to allow for the free passage of the traveling trolley and, at this point, it should be stated, that the means (the bell crank 73) for closing the outgoing switch and the means (presently explained) actuated by the crossing over trolley for adjusting the block system are correlatively so arranged that the block system is first set for cable releasing and arresting an incoming trolley on the return cable, before the outgoing switch is closed, so that the trolley traveling in the return direction is positively held up before the trolley on the cross over reaches the outgoing switch, and the distance space between the switch throwing means and the block or brake system is such, that an incoming trolley, on the return cable, that may have just passed the hold-up or brake devices, will have a clear track rail past the outgoing switch mechanism about to be shifted by the crossing over trolley.

At a suitable distance back of each outgoing switch is located a cable grip release pin 90 and each of the pins 90 rides through an aperture in the trolley rail and pivotally connects with a crank 91 on a horizontal rock shaft 92 journaled in bracket bearings on the back of the trolley rail, as is best shown in Figs. 22 and 23.

96 designates another crank member attached to the rod 92 whose upper end connects through a link 97 with the bell crank lever 86 and 93 is a third crank on the rock shaft 92 with which pivotally connects the lower end of a link rod 93ª, the upper end of which joins with a bell crank 98, in turn connected by the cable 99 and a horizontally disposed bell crank 100 located within the building and in such relation to the cross over rail that the cam shoe of the passing trolley engages it before the bell crank 73 is engaged, it being understood from the drawings that when the bell crank 100 is engaged, as stated, the link rod 93ª is pulled up, see arrow $h$, and thereby rocks the shaft 92, pushes the trip pin 90 through the trolley rail in position for being engaged by the cable releasing or tripping lever 46 and simultaneously shifts the link 97, bell crank 86 and link 83 to move the brake band 81 in position for stopping the trolley, it being understood that the operation of releasing the cable occurs before the cam shoe 30 on the trolley engages the brake band 81, see diagram Fig. 20.

A back stop pawl 101 is attached to a guide member on the trolley rail for holding the trolley from movement in one direction and 102 is a stop arm attached to the rock shaft 92 that stops the trolley from movement in the other direction and the said members 101 and 102 serve to hold the trolley steady during the operation of shifting the gripping mechanism for again gripping the cable after the brake band devices are automatically adjusted for releasing the trolley, as will be now explained.

After a trolley on the return rail, that approaches the selected cross over outgoing switch mechanism (from which a crossing trolley is about to pass) has been blocked as before mentioned, as the cross over trolley passes the outgoing switch and takes the main or return rail, a stop 88 (see Fig. 21ᴬ) suitably mounted on the said return line, engages the stop roller 47 on the disk 16 and rotates the said disk in a direction (see arrow $m$ on Fig. 26) to cause the cable jaws to rise up and to close and grip the cable.

As the cross over trolley passes back onto the return line, as stated, it engages a bell crank lever 105 (Figs. 21ᴬ and 30) that is suitably located along the main line, and which, through a cable connection 105ª, joins with a lever 106 (Figs. 26 and 27) fulcrumed on a bracket 107 pendent from the top or guide rail 11. The lower end of the lever 106, through a link member 106ª pivotally connects with a shiftable member 108 that is slidably mounted on a slotted guide way 109 on the trolley rail and provided with a tripping lug 109ª adapted for being moved into engagement with the stop roller 47 (see Fig. 26) that projects from the rear face of the disk 16, for turning the disk in the direction of the said arrow $m$ and thereby restore the gripping jaws to the cable gripping position. The same pull on the lever 106 that operates to turn the disk 16 turns the shaft 92 (Figs. 22 and 23) back for withdrawing the pin 90 and for shifting the connections 96, 97, 86 and 83 to free the brake band from a braking or trolley arresting position.

To provide for turning the shaft 92 through the swing of the lever 106, as stated, the said lever has a cam heel 106ᵇ that engages a crank-like cam member 111 on the rock shaft 92 and in such a manner that when the said lever 106 is pulled in the direction indicated, the cam heel 106ª engages the cam-like member 111 on the shaft 92 and thereby causes the shaft to return in a reverse direction and through the shifting of the members 96, 97, 86 and 83 pull the brake 81 back out of the path of the cam shoe 30 on the trolley and at the same time pull the release pin 90 back and out of operative position. A spring 112 restores the lever 106 to its normal position when tension on its pulling cable 105ª is released.

At each corner of the building around which the cable and the trolley rail pass, a release stop 114 and a pick-up stop 115 are suitably located, the stop 114 being positioned for engaging the trip lever 46 on the trolley for releasing the cable and the stop 115 for being engaged by the stud roller 47 on the back of the disk 16 which turns the said disk for restoring the cable grip.

A safety device comes into play in the event of a pair of trolleys running into or colliding and, for such purpose, each trolley has a forwardly projecting rod 116 (Fig. 5) that connects with a wrist pin 117 on the disk 16 in such manner that impact on the front end of the rod with another trolley will rotate the disk 16 and thereby pull the cable gripping mechanism down with the jaws opened from contact with the cable.

From the foregoing description taken in connection with the accompanying drawings, the complete construction, the manner of operation and the general advantages of my conveyer system will be readily understood by those skilled in the art to which this invention relates.

While I have specifically shown my system as adapted for conveying and delivering commodities to warehouse compartments, it is obvious that without departing from the generic features of my invention or materially modifying the details of structure outlined, the said system may be readily arranged for the distribution of cotton bales and miscellaneous freights to and from cars and compress, to and from ship side, wharves, terminals, over tracks, buildings and streets, or in other words, the system shown can be modified to carry also any commodity of general commercial use under conditions heretofore impossible on account of the flexibility now to be obtained with my system.

What I claim is:

1. In a trolley system, a track including a curved section, a power cable above the track, guides for said cable including vertical sheaves along the straight way and horizontal sheaves at the turns, carriages traveling on the track beneath the cable, cable grip devices on the carriage, means on the track to release the grip devices on approaching a curve to permit the carriage to pass under its own momentum around the curve and under the cable and its sustaining sheave and other means on the track for restoring the cable grip after the carriage has passed the curve.

2. In combination with a trackway, a carriage traveling thereon, a draft cable paralleling the track above the same, cable grip devices on the carriage, vertical cable sustaining sheaves adapted to be moved out of the way of an approaching carriage, means on the carriage to move the sheaves aside as the carriage passes the same and means for restoring the sheaves to place.

3. In combination with a trackway, a carriage traveling thereon, a draft cable paralleling the track above the same, cable grip devices on the carriage, vertical cable sustaining sheaves adapted to be moved out of the way of an approaching carriage, means on the carriage to move the sheaves aside as the carriage passes the same and means for restoring the sheaves to place, and means on the track to release and restore the cable grip at intervals, whereby the carriage can travel under its own momentum, pass obstructions and under the cable.

4. In a trolley system, an overhead live cable, cable supporting sheaves, a trolley equipped with a cable grip and with means whereby the cable supporting sheaves are deflected by the passing trolley to permit the passage of the cable grip.

5. In a trolley system, an overhead live cable, cable supporting sheaves, a trolley equipped with a cable grip and with means whereby the cable supporting sheaves are deflected by the passing trolley to permit the passage of the cable grip, and other means for restoring the sheaves to their cable engaging positions after the cable grip has passed them.

6. In a trolley system of the character stated and in which is included a live overhead cable; a trolley carrier, an automatically operating cable grip for releasing and fastening to the cable, cable supporting sheaves, means on the trolley carriage for engaging and deflecting the cable sheaves during the passage of the trolley without disengaging the grip from the cable, and means for restoring the sheaves to their cable engaging position after the trolley passes them.

7. In a trolley system of the character stated and which includes a live cable, a rail, and a trolley carrier engaging the rail; a cable gripping mechanism carried on the trolley carrier automatically shiftable at predetermined times under momentum of the trolley carrier to engage and disengage the cable without stopping the carriage.

8. In a trolley system of the character stated which includes a live cable, a rail including a curved section, and a trolley carrier engaging the rail; a cable grip mechanism carried on the trolley carrier automatically shifted at predetermined times under momentum of the trolley carrier to engage and disengage the cable and to pass with the traveling carrier under the cable.

9. In a trolley system of the character stated, a live cable running overhead, a trolley, cable gripping means movable with the trolley, tripping devices along the trolley path adapted for shifting the gripping means into and out of connection with the cable and other means on the trolley for indicating the predetermined point along the trolley path at which the cable is to be released or engaged.

10. In a trolley system of the character stated, a live overhead cable, a track rail, a trolley, mechanism on the trolley for gripping and releasing the cable, devices along the track rail for effecting the release and gripping operations of the said mechanism, some of the said devices being at fixed and other of the said devices being at selected points along the track rail.

11. In a load conveying and discharging system in which is included a trackway and an overhead live cable; a trolley adapted to travel on the trackway, a cable grip mechanism mounted on the trolley and including a carriage vertically shiftable with respect to the cable and opposing cable gripping jaws, connections joining the vertically shiftable carriage and the jaws adapted to close the jaws onto the cable as the carriage with the jaws is elevated and for opening the jaws to disengage the cable as the carriage is lowered and means manually and automatically operable for raising and lowering the gripper jaws and the carriage.

12. In a load conveying and discharging system in which is included a trackway and an overhead live cable; a trolley adapted to travel on the trackway, a cable grip mechanism mounted on the trolley and including a carriage vertically shiftable with respect to the cable and opposing cable gripping jaws, connections joining the vertically shiftable carriage and the jaws adapted to close the jaws onto the cable as the carriage with the jaws is elevated and for opening the jaws to disengage the cable as the carriage is lowered and means manually and automatically operable for raising and lowering the gripper jaws and the carriage and further means for holding the said carriage locked at either of its shifted movements.

13. In a load conveying and discharging system in which is included a trackway and an overhead live cable; a trolley adapted to travel on the trackway, a cable grip mechanism mounted on the trolley and including a carriage vertically shiftable with respect to the cable and opposing cable gripping jaws, connections joining the vertically shiftable carriage and the jaws adapted to close the jaws onto the cable as the carriage with the jaws is elevated and for opening the jaws to disengage the cable as the carriage is lowered and means manually and automatically operable for raising and lowering the gripper jaws and the carriage, said means including a rotary disk, a link connecting the disk and the gripper jaws carriage, a rocking lever mounted on the trolley frame, a link connection that joins one end of the said lever with a crank connection on the disk, and stops at fixed points along the trolley rail for engaging the said lever whereby to shift the said disk and thereby shift the grip device from the cable engaging position.

14. In a load conveying and discharging system in which is included a trackway and an overhead live cable; a trolley adapted to travel on the trackway, a cable grip mechanism mounted on the trolley and including a carriage vertically shiftable with respect to the cable and opposing cable gripping jaws, connections joining the vertically shiftable carriage and the jaws adapted to close the jaws onto the cable as the carriage with the jaws is elevated and for opening the jaws to disengage the cable as the carriage is lowered and means manually and automatically operable for raising and lowering the gripper jaws and the carriage, said means including a rotary disk, a link connecting the disk and the gripper jaws carriage, a rocking lever mounted on the trolley frame, a link connection that joins one end of the said lever with a crank connection on the disk, and stops at fixed points along the trolley rail for engaging the said lever whereby to shift the said disk and thereby shift the grip device from the cable engaging position, and a crank stud on the disk for engaging a stop on the track rail structure whereby to shift the gripping jaws up to engage and grip the cable.

15. In a load conveying and discharging system in which is included a live overhead cable and a trackway paralleling the said cable; a load carrying trolley, vertical guideways on the frame thereof, a cable gripping mechanism mounted on the trolley frame and comprising a carriage vertically slidable in the guideways on the trolley frame, a pair of coöperating pivoted gripper jaws mounted on and movable with the said carriage, toggle links connecting the lower end of the jaws, means on the trolley frame for moving the jaw holding carriage to and from the cable, the said means comprising a rotary disk having a rotating member attached thereto, a link connection that joins the disk and the carriage stops on the trolley frame, and a toggle link spreader device coöperative with the stops for closing the gripper jaws onto the cable when the cable carriage is forced upwardly.

16. In a load conveying and discharging system in which is included a live overhead cable and a trackway paralleling the said cable; a load carrying trolley, vertical guideways on the frame thereof, a cable gripping mechanism mounted on the trolley frame and comprising a carriage vertically slidable in the guideways on the trolley frame, a pair of coöperating pivoted gripper jaws mounted on and movable with the said carriage, toggle links connecting the lower ends of the jaws, means on the trolley frame for moving the jaw holding carriage to and from the cable, the said means comprising a rotary disk having a rotating member attached thereto, a link connection that joins the disk and the carriage stops on the trolley frame, and a toggle link spreader device coöperative with the stops for closing the gripper jaws onto the cable when the cable carriage is forced upwardly, and means tending to hold the gripping jaws normally open.

17. In a load conveying and discharging system in which is included a live overhead cable and a trackway paralleling the said cable; a load carrying trolley, vertical guideways on the frame thereof, a cable gripping mechanism mounted on the trolley frame and comprising a carriage vertically slidable in the guideways on the trolley frame, a pair of coöperating pivoted gripper jaws mounted on and movable with the said carriage, toggle links connecting the lower ends of the jaws, means on the trolley frame for moving the jaw holding carriage to and from the cable, the said means comprising a rotary disk having a rotating member attached thereto, a link connection that joins the disk and the carriage stops on the trolley frame, and a toggle link spreader device coöperative with the stops for closing the gripper jaws onto the cable when the cable carriage is forced upwardly, and means tending to hold the gripping jaws normally open, and devices tending to rotate the disk to pull the grip holding carriage down from the cable.

18. In a load conveying and discharging system in which is included a live overhead cable and a trackway paralleling the said cable; a load carrying trolley, vertical guideways on the frame thereof, a cable gripping mechanism mounted on the trolley frame and comprising a carriage vertically slidable in the guideways on the trolley frame, a pair of coöperating pivoted gripper jaws mounted on and movable with the said carriage, toggle links connecting the lower ends of the jaws, means on the trolley frame for moving the jaw holding carriage to and from the cable, the said means comprising a rotary disk having a rotating member attached thereto, a link connection that joins the disk and the carriage stops on the trolley frame, and a toggle link spreader device coöperative with the stops for closing the gripper jaws onto the cable when the cable carriage is forced upwardly, means tending to hold the gripping jaws normally open, devices tending to rotate the disk to pull the grip holding carriage down from the cable and other means connected with the disk and extended in the path of a projection on the trackway and adapted when engaging the projection to turn the disk to move the gripper jaws to the cable release position.

EDWARD HANAK.

Copies of this patent may be obtained for five cents each, by addressing the "Commissioner of Patents, Washington, D. C."